United States Patent
Shi et al.

(10) Patent No.: US 12,218,333 B2
(45) Date of Patent: Feb. 4, 2025

(54) HEAT DISSIPATION DEVICE OF ENERGY STORAGE SYSTEM AND HEAT DISSIPATION METHOD FOR ENERGY STORAGE SYSTEM

(71) Applicant: PYLON TECHNOLOGIES CO., LTD., Shanghai (CN)

(72) Inventors: Lu Shi, Shanghai (CN); Baishuang Chen, Shanghai (CN); Zhiqiang Yu, Shanghai (CN)

(73) Assignee: PYLON TECHNOLOGIES CO., LTD., Shanghai (CN)

( * ) Notice: Subject to any disclaimer, the term of this patent is extended or adjusted under 35 U.S.C. 154(b) by 411 days.

(21) Appl. No.: 17/625,773

(22) PCT Filed: Jul. 27, 2021

(86) PCT No.: PCT/CN2021/108549
§ 371 (c)(1),
(2) Date: Jan. 10, 2022

(87) PCT Pub. No.: WO2022/166130
PCT Pub. Date: Aug. 11, 2022

(65) Prior Publication Data
US 2023/0352772 A1    Nov. 2, 2023

(30) Foreign Application Priority Data
Feb. 2, 2021    (CN) .......................... 202110145288.1

(51) Int. Cl.
*H01M 10/663*    (2014.01)
*H01M 10/613*    (2014.01)
(Continued)

(52) U.S. Cl.
CPC ....... *H01M 10/663* (2015.04); *H01M 10/613* (2015.04); *H01M 10/6564* (2015.04); *H01M 10/6566* (2015.04)

(58) Field of Classification Search
CPC .. H01M 50/204; H01M 10/63; H01M 10/635; H01M 10/6551; H01M 10/6564;
(Continued)

(56) References Cited

U.S. PATENT DOCUMENTS

| | | | |
|---|---|---|---|
| 6,225,788 B1 * | 5/2001 | Kouzu | H01M 10/613 320/150 |
| 2004/0010357 A1 * | 1/2004 | Kubota | B60L 50/66 701/1 |

(Continued)

FOREIGN PATENT DOCUMENTS

| | | |
|---|---|---|
| CN | 206976530 U | 2/2018 |
| CN | 109148999 A | 1/2019 |

(Continued)

OTHER PUBLICATIONS

Decision to Grant a Patent received in the corresponding Japanese application 2021-578228, drafted on Nov. 13, 2023.

(Continued)

*Primary Examiner* — Tho V Duong
(74) *Attorney, Agent, or Firm* — Kilpatrick Townsend & Stockton LLP

(57) ABSTRACT

The present disclosure provides a heat dissipation device of an energy storage system and a heat dissipation method for an energy storage system, wherein the heat dissipation device comprises: a housing, wherein at least one frame is provided in the housing, the energy storage system is placed in the at least one frame, a curved-surface guide plate is provided on the top of the at least one frame, at least one air conditioner is hung outside the housing, a cold air outlet of (Continued)

each air conditioner is connected to the curved-surface guide plate; a guide cavity is formed between a concave surface of the curved-surface guide plate and the at least one frame, a spreader plate is provided in the guide cavity, and the spreader plate is configured to adjust a flow direction of gas in the guide cavity.

14 Claims, 2 Drawing Sheets

(51) Int. Cl.
*H01M 10/6564* (2014.01)
*H01M 10/6566* (2014.01)

(58) Field of Classification Search
CPC .......... H01M 10/6566; H01M 2220/10; Y02E 60/10
See application file for complete search history.

(56) References Cited

U.S. PATENT DOCUMENTS

| | | | | |
|---|---|---|---|---|
| 2011/0256431 | A1* | 10/2011 | TenHouten | H01M 10/617 |
| | | | | 429/50 |
| 2012/0214041 | A1* | 8/2012 | Harada | H01M 10/6566 |
| | | | | 361/274.1 |
| 2021/0111449 | A1* | 4/2021 | Fukuhara | H01M 50/209 |
| 2021/0164718 | A1* | 6/2021 | Lin | B65D 88/121 |
| 2021/0234215 | A1* | 7/2021 | Nakahama | H01M 10/6556 |

FOREIGN PATENT DOCUMENTS

| | | |
|---|---|---|
| CN | 109742482 A | 5/2019 |
| CN | 211350908 U | 8/2020 |
| CN | 111697287 A | 9/2020 |
| CN | 211605363 U | 9/2020 |
| CN | 211789385 U | 10/2020 |
| CN | 211980696 U | 11/2020 |
| CN | 212366085 U | 1/2021 |
| JP | 2015037019 A | 2/2015 |
| JP | 2015060798 A | 3/2015 |
| KR | 20200009603 A | 1/2020 |
| WO | 2015087671 A1 | 6/2015 |
| WO | 2016134589 A1 | 9/2016 |
| WO | 2018045131 A1 | 3/2018 |

OTHER PUBLICATIONS

Notification to Grant Patent Right received in the Chinese priority application 202110145288.1, issued on Jan. 4, 2023.
Notice of Reasons for Refusal received in the corresponding Japanese application 2021-578228, drafted on Apr. 25, 2023.
First Office Action received in the Chinese priority application 202110145288.1, issued on Aug. 2, 2022.
Second Office Action received in the Chinese priority application 202110145288.1, issued on Nov. 10, 2022.
First examination report received in the corresponding Australia application 2021310843, mailed on Nov. 15, 2022.
First Office Action received in the corresponding European application 21830311.3, mailed on Sep. 26, 2023.
European search report received in the corresponding European application 21830311.3, mailed on Sep. 14, 2023.
First search report received in the Chinese priority application 202110145288.1.
Notice of acceptance received in the corresponding Australia application 2021310843, mailed on May 31, 2023.

* cited by examiner

HEAT DISSIPATION DEVICE OF ENERGY STORAGE SYSTEM AND HEAT DISSIPATION METHOD FOR ENERGY STORAGE SYSTEM

The present disclosure claims the priority to the Chinese patent application with the filing No. 202110145288.1, filed on Feb. 2, 2021 with the Chinese Patent Office, the contents of which are incorporated herein by reference in entirety.

TECHNICAL FIELD

The present disclosure belongs to the field of energy storage technologies, for example, relates to a heat dissipation device of an energy storage system and a heat dissipation method for an energy storage system.

BACKGROUND ART

The container energy storage system mainly consists of a container type machine room, a battery pack, a battery management system (BMS), a power conversion system (PCS), an auxiliary control system, etc., wherein the auxiliary control system is mostly a temperature control system, a fire fighting system and the like. The container energy storage system has the advantages such as a small occupied area, convenient installation and transportation, short construction period, strong environment adaptability, and high intelligent degree. The container energy storage system can be used for scenes such as networking type microgrid, independent type microgrid, distributed power generation, and smart grid, and provides powerful support for realizing large-scale application of renewable energy sources such as wind and light. Meanwhile, the container energy storage system also can be used as a mobile emergency power supply.

Due to complexity and uncertainty of actual working conditions, a plurality of single batteries in a working state inevitably have difference, so that it is quite hard to ensure consistency of working temperatures of the batteries. If the temperature difference between a plurality of batteries is increased, the performance and service life of battery module will be affected, and even potential safety hazards are caused.

CN109638379A discloses a reverse-flow-type double-air-channel cooling system for an energy storage module, wherein the system includes a box body, an air suction device, an energy storage module, and a heat dissipation device, the air suction device, the energy storage module, and the heat dissipation device are provided in the box body, and the energy storage module is provided on the heat dissipation device; the box body is provided with an air inlet and an air outlet, the energy storage module includes a plurality of single battery cells, a gap is formed between every two single battery cells, a first air channel for air to flow is formed in the gap, and the first air channel is in communication with the air inlet of the box body and the air outlet of the box body; a second air channel, with the air flowing in the direction opposite to that in the first air channel, is provided in the heat dissipation device, and the second air channel is in communication with the air inlet of the box body and the air outlet of the box body, and the reverse-flow-type double-air-channel cooling system is formed by the first air channel and the second air channel. This application has the characteristic of good temperature equalization effect by cooling the energy storage module by the reverse-flow-type double air channels, however, this cooling system cannot guarantee to carry out the temperature uniformity regulation and control to the battery cells in different operating conditions.

CN109037542A discloses a mobile energy storage battery cabinet with good heat dissipation, wherein the battery cabinet includes a cabinet body, a base, and a liquid storage tank; the cabinet body is provided above the base, and a heat insulating plate is provided at a joint of the cabinet body and the base; the liquid storage tank is fixed to a lower part of the base; the cabinet body and a right side of the base are in communication with each other through a liquid inlet pipe, and the cabinet body and a left side of the base are in communication with each other through a liquid outlet pipe. In this application, a cooling liquid in the liquid storage tank is extracted by a pump body and sent into a plurality of cooling pipelines inside the cabinet body, heat inside the cabinet body is quickly absorbed by the aluminum-made cooling pipelines, and the heat is transferred to the cooling liquid flowing through the inside of the cooling pipelines, thereby realizing the quick cooling of the cabinet body, with high heat dissipation efficiency. The problem of poor battery temperature uniformity still exists in this battery cabinet.

CN111029496A discloses an energy storage battery heat dissipation support capable of efficiently dissipating heat, wherein the heat dissipation support includes a support body, a forced ventilation module, a water-cooling heat dissipation chassis module, and a flow field control device module, the forced ventilation module includes at least one ventilation pipeline, an air inlet, and an air outlet, and one flow field control device module is connected in each ventilation pipeline; and the water-cooling heat dissipation chassis module is arranged at the bottom of the support body. Two cooling modes of air cooling and water cooling are integrated on the heat dissipation support, then the cooling effect is improved, the ventilation pipeline and the support body are integrated, an air channel does not need to be additionally arranged, but the structure of this heat dissipation support is complex.

The heat dissipation devices have the problems of complex structure, poor adaptability, poor battery temperature uniformity and so on, therefore, how to ensure that the temperature uniformity and adaptability of the batteries in the energy storage module are strong in the situation that the heat dissipation devices have a simple structure becomes a problem to be solved urgently.

SUMMARY

The present disclosure provides a heat dissipation device of an energy storage system and a heat dissipation method for an energy storage system, wherein by combining a curved-surface guide plate and a spreader plate (splitter plate), the distribution of cold air of an air conditioner is effectively adjusted, and the temperature uniformity of an energy storage module is ensured. The heat dissipation device of an energy storage system has the characteristics of a simple structure, strong adaptability, high heat dissipation efficiency and so on.

The present disclosure provides a heat dissipation device of an energy storage system, wherein the heat dissipation device includes: a housing, wherein at least one frame is provided in the housing, the energy storage system is placed in the at least one frame, a curved-surface guide plate is provided on the top of the at least one frame, at least one air conditioner is hung outside the housing, a cold air outlet of each air conditioner is connected to the curved-surface guide plate; a guide cavity is formed between a concave surface of the curved-surface guide plate and the at least one frame, a spreader plate is provided in the guide cavity, and the spreader plate is configured to adjust a flow direction of gas in the guide cavity.

Optionally, the energy storage system includes at least one battery module.

Optionally, each frame is provided with at least one battery compartment penetrating through the each frame, and the battery module is placed in the battery compartment.

Optionally, the at least one battery compartment provided on each frame is arranged in a matrix on the each frame.

Optionally, the curved-surface guide plate is provided along a long side of the at least one frame.

Optionally, the curved-surface guide plate has a section in a fan shape.

Optionally, a central angle of the fan shape ranges 60°~100°, for example, a central angle is 60°, 65°, 70°, 75°, 80°, 85°, 90°, 95°, or 100°.

Optionally, the central angle of the fan shape is 90°.

Optionally, a ventilation baffle is provided between the curved-surface guide plate and the cold air outlet of the at least one air conditioner, and the ventilation baffle protrudes from an edge of the at least one frame; and the ventilation baffle is provided with at least one cold air port and at least one air vent, and the cold air outlet of each air conditioner is connected to one cold air port.

Optionally, the at least one cold air port and the at least one air vent are provided alternately.

Optionally, an air vent sliding plate is movably provided at each air vent, and an opening degree of each air vent is adjusted through sliding of the air vent sliding plate.

Optionally, a distance between the frame and a side wall of the housing ranges 100 mm-200 mm, for example, the distance is 100 mm, 110 mm, 120 mm, 130 mm, 140 mm, 150 mm, 160 mm, 170 mm, 180 mm, 190 mm or 200 mm.

Optionally, a first end and a second end of the at least one frame are each provided with an air partition plate, and a hot air passage is formed between the housing, the air partition plate, and the ventilation baffle.

Optionally, the air partition plate is provided with an air partition opening.

Optionally, the air partition opening is provided close to a side of the top of the at least one frame.

Optionally, an air partition opening sliding plate is movably provided at the air partition opening, and an opening degree of the air partition opening is adjusted through sliding of the air partition opening sliding plate.

Optionally, the air vent sliding plate and the air partition opening sliding plate are each provided with a transmission member, the transmission member of the air vent sliding plate is configured to drive the sliding of the air vent sliding plate, and the transmission member of the air partition opening sliding plate is configured to drive the sliding of the air partition opening sliding plate.

Optionally, at least one hot air outlet is provided on a side wall of the housing located at the hot air passage.

Optionally, a return air fan of the air conditioner is provided at each hot air outlet.

Optionally, the at least one frame includes two sets of symmetrically provided frames, a cold air passage is formed between the two sets of frames, two curved-surface guide plates are provided, one curved-surface guide plate is provided on the top of each set of frame, a guide cavity is formed between a concave surface of the one curved-surface guide plate and each set of the frames, and opening sides of the two guide cavities are provided opposite to each other.

Optionally, two spreader plates are provided, each guide cavity is provided therein with a spreader plate, and the spreader plate is obliquely provided in the each guide cavity.

Optionally, a plane where each spreader plate is located is perpendicular to a top surface of the two sets of frames.

Optionally, a guide rail is provided on a side of the concave surface of each curved-surface guide plate, the guide rail is arranged along a length direction of the each curved-surface guide plate, and the spreader plate in the guide cavity formed by the each curved-surface guide plate is slidably provided on the guide rail.

Optionally, a drive member is provided on each spreader plate, and the drive member is provided to drive the each spreader plate to slide along the guide rail where the each spreader plate is located.

Optionally, at least one temperature sensor is uniformly arranged on the at least one frame, and the at least one temperature sensor is configured to detect a temperature of the energy storage system; the heat dissipation device further includes a controller, the controller is independently electrically connected to each temperature sensor, the drive member, the transmission member, and each air conditioner, the controller is configured to receive a feedback signal sent by the at least one temperature sensor, and control rotation of the drive member, a refrigeration parameter of each air conditioner, and stretching of the transmission member according to the feedback signal, the refrigeration parameter of each air conditioner is used to adjust an air volume of cold air of and a temperature of the cold air of the each air conditioner, and a rotation speed of the return air fan of the each air conditioner is adjusted by the air volume of the cold air of the each air conditioner.

The present disclosure provides a heat dissipation method for an energy storage system, using the above heat dissipation device of an energy storage system. The heat dissipation method includes a following step: cold air in at least one air conditioner, through the curved-surface guide plate, being blown into the housing, and the spreader plate adjusting a flow direction of the cold air to cool and dissipate heat for the energy storage system.

Optionally, the step of cold air in at least one air conditioner, through the curved-surface guide plate, being blown into the housing, and the spreader plate adjusting a flow direction of the cold air to cool and dissipate heat for the energy storage system includes: cold air generated by at least one air conditioner, after being guided through the curved-surface guide plate and the spreader plate, being blown into the cold air passage to cool and dissipate heat for the energy storage system on the at least one frame, and the cold air, after exchanging heat with the energy storage system, entering the hot air passage and being discharged by the at least one return air fan; in a situation that at least one temperature sensor detects that the temperature of the energy storage system is higher than a first temperature threshold, the controller adjusting at least one air conditioner, to increase the air volume of cold air of the at least one air conditioner, lower the temperature of the cold air, and increase the rotation speed of the at least one return air fan; and in a situation that at least one temperature sensor detects that the temperature of the energy storage system is uneven, the controller controlling the drive member to drive the spreader plate to slide along the guide rail so as to adjust distribution of cold air.

Optionally, the first temperature threshold ranges 55° C.~65° C., for example, the first temperature threshold is 55° C., 56° C., 57° C., 58° C., 59° C., 60° C., 61° C., 62° C., 63° C., 64° C. or 65° C.

Optionally, the air volume of cold air of each air conditioner ranges 1000 m³/h~2000 m³/h, for example, the air volume of cold air is 1000 m³/h, 1100 m³/h, 1200 m³/h, 1300 m³/h, 1400 m³/h, 1500 m³/h, 1600 m³/h, 1700 m³/h, 1800 m³/h, 1900 m³/h or 2000 m³/h.

Optionally, the temperature of the cold air of each air conditioner ranges 15° C.~20° C., for example, the temperature is 15° C., 16° C., 17° C., 18° C., 19° C. or 20° C.

Optionally, the system refers to an apparatus system, a device system, or a production device.

The numerical ranges described in the present disclosure not only include the above-exemplified point values, but also include any point values that are not exemplified between the above-mentioned numerical ranges, and due to the limitation of space and for the sake of brevity, the present disclosure will not exhaustively list the point values included in the stated ranges.

Figure 1:
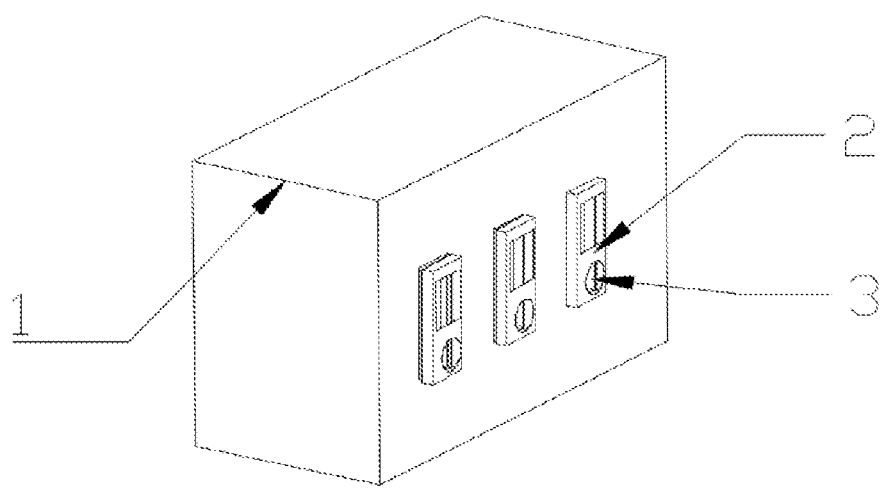
FIG. 1 is an appearance schematic view of a heat dissipation device of an energy storage system provided in a specific embodiment of the present disclosure.

In the drawings, 1—housing; 2—air conditioner; 3—return air fan; 4—frame; 5—curved-surface guide plate; 6—spreader plate; 7—battery compartment; 8—air partition plate; 9—ventilation baffle; 10—cold air port; 11—air vent.

DETAILED DESCRIPTION OF EMBODIMENTS

In the description of the present disclosure, orientation or positional relations indicated by terms "center", "longitudinal", "horizontal", "upper", "lower", "front", "back", "left", "right", "vertical", "horizontal", "top", "bottom", "inner", "outer" and so on are based on orientation or positional relations as shown in the accompanying drawings, merely for facilitating the description of the present disclosure and simplifying the description, rather than indicating or implying that related devices or elements have to be in the specific orientation or configured and operated in a specific orientation, therefore, they should not be construed as limiting the present disclosure.

In the description of the present disclosure, unless otherwise specified and defined explicitly, terms "provide", "join", and "connect" should be construed in a broad sense, for example, it may be a fixed connection, a detachable connection, or an integral connection; it may be a mechanical connection, and also may be an electrical connection; it may be a direct connection, an indirect connection through an intermediary, or inner communication between two elements. For those ordinarily skilled in the art, meanings of the above-mentioned terms in the present disclosure could be understood according to circumstances. The technical solutions of the present disclosure are described below through specific embodiments.

Figure 2:
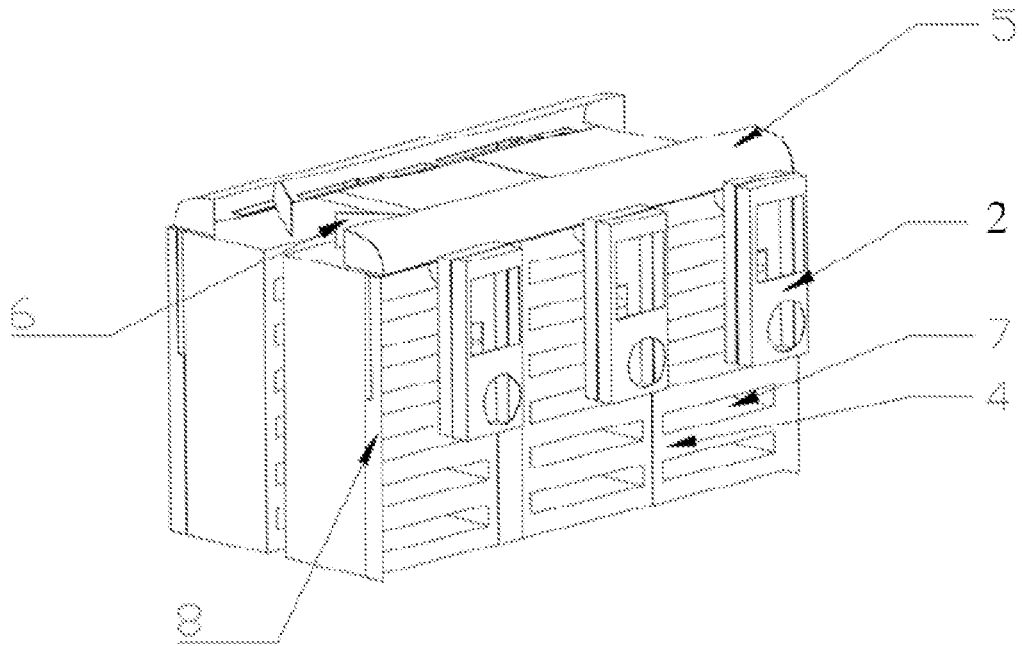
FIG. 2 is a structural schematic view inside a housing of the heat dissipation device of an energy storage system provided in a specific embodiment of the present disclosure.

In a specific embodiment, the present disclosure provides a heat dissipation device of an energy storage system, as shown in FIG. 1 and FIG. 2, the heat dissipation device includes a housing 1, at least one frame 4 is provided in the housing 1, the energy storage system is placed in the frame 4, a curved-surface guide plate 5 is provided on the top of the frame 4, at least one air conditioner 2 is hung outside the housing 1, a cold air outlet of each air conditioner 2 is connected to the curved-surface guide plate 5; a guide cavity is formed between a concave surface of the curved-surface guide plate 5 and the frame 4, a spreader plate 6 is provided in the guide cavity, and the spreader plate 6 is configured to adjust a flow direction of gas in the guide cavity.

In the present disclosure, by providing the curved-surface guide plate 5 and the spreader plate 6 on the top of the frame 4, cold air of the air conditioner 2 enters from the top of the frame 4, and is reasonably distributed, then more cold air is distributed to places with a higher temperature, so that the temperature distribution of the whole energy storage system is uniform, then a good working environment is provided for the battery, and the service life of the energy storage system is extended. The heat dissipation device of an energy storage system has the characteristics such as a simple structure, strong adaptability, high heat dissipation efficiency, and good temperature uniformity of the energy storage module.

The energy storage system includes at least one battery module, at least one battery compartment 7 penetrating through the frame 4 is provided in the frame 4, and the battery module is placed in the battery compartment 7. The battery compartments 7 are arranged in a matrix on the frame 4.

The curved-surface guide plate 5 is provided along a long side of the frame 4, and the curved-surface guide plate 5 has a section in a fan shape. A central angle of the fan shape ranges 60°~100°. Optionally, the central angle of the fan shape is 90°.

A ventilation baffle 9 is provided between the curved-surface guide plate 5 and the cold air outlet of the air conditioner 2, and the ventilation baffle 9 protrudes from an edge of the frame 4.

Figure 3:
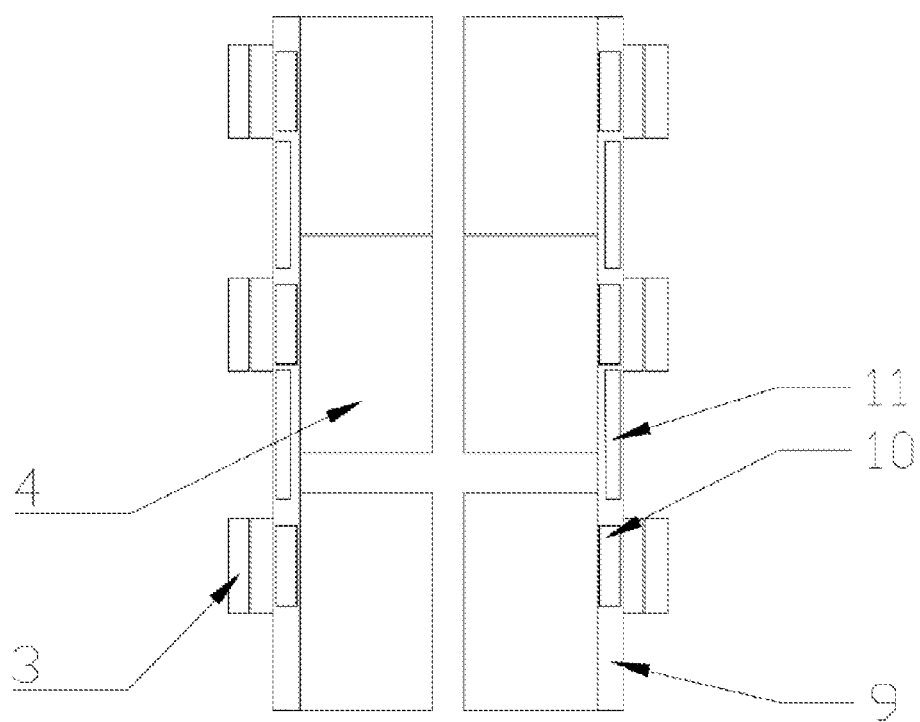
FIG. 3 is a structural schematic view of a ventilation baffle provided in a specific embodiment of the present disclosure.

As shown in FIG. 3, the ventilation baffle 9 is provided with at least one cold air port 10 and at least one air vent 11, and the cold air outlet of the air conditioner 2 is connected to the cold air port 10. The cold air port 10 and the air vent 11 are provided alternately, an air vent sliding plate is movably provided at the air vent 11, and an opening degree of the air vent 11 is adjusted through sliding of the air vent sliding plate. In the present disclosure, by providing the air vent 11, when the flow rate of cold air in the air conditioner 2 is insufficient, part of the hot air is mixed with cold air through the air vent 11, to supplement the air volume. The opening degree of the air vent 11 is controlled by providing the air vent sliding plate, so that the air volume of hot air entering the air vent 11 is adjusted.

A distance between the frame 4 and a side wall of the housing 1 ranges 100 mm~200 mm. A first end and a second end of the frame 4 are each provided with an air partition plate 8, and a hot air passage is formed between the housing 1, the air partition plate 8, and the ventilation baffle 9. The air partition plate 8 is provided with an air partition opening, and the air partition opening is provided close to a side of the top of the frame 4. An air partition opening sliding plate is movably provided at the air partition opening, and an opening degree of the air partition opening is adjusted through sliding of the air partition opening sliding plate. The air vent sliding plate and the air partition opening sliding plate are each provided with a transmission member, the transmission member of the air vent sliding plate is configured to drive the sliding of the air vent sliding plate, and the transmission member of the air partition opening sliding plate is configured to drive the sliding of the air partition opening sliding plate.

In the present disclosure, after the cold air conducts convective heat exchange for the energy storage system, the cold air is heated into hot air and enters the hot air passage, so that the hot air and the cold air form an "air partition" structure through the air partition plate 8, thereby reducing the backflow of the hot air, and discharging most of the hot air through the return air of the air conditioner 2. By providing the air partition opening sliding plate, a proportion of backflow of the hot air is adjusted.

A hot air outlet is provided on a side wall of the housing 1 located at the hot air passage. A return air fan 3 of the air conditioner is provided at each hot air outlet.

The housing 1 includes two sets of symmetrically provided frames 4 therein, a cold air passage is formed between the two sets of frames 4, and opening sides of the two guide cavities are provided opposite to each other. In the present disclosure, by symmetrically providing the two sets of frames 4, and providing the opening sides of the two guide cavities opposite to each other, cold air in the guide cavities on the two sets of frames 4 is blown into the cold air passage between the two sets of frames 4, thus improving the distribution and convection of cold air, and improving a space utilization ratio and heat dissipation efficiency.

The spreader plate 6 is obliquely provided in the guide cavity, and a plane where the spreader plate 6 is located is perpendicular to a top surface of the frame. A guide rail is provided on a side of the concave surface of the curved-surface guide plate 5, the guide rail is arranged along a length direction of the curved-surface guide plate 5, and the spreader plate 6 is slidably provided on the guide rail. A drive member is provided on the spreader plate 6, and the drive member is provided to drive the spreader plate 6 to slide along the guide rail.

In the present disclosure, the spreader plate 6 is provided on the guide rail, the distribution of cold air is controlled by sliding and adjusting the spreader plate 6, and for a part with a higher temperature, the spreader plate 6 is used to increase the flow rate of the cold air in this part, thus improving the temperature uniformity of the energy storage module.

At least one temperature sensor is uniformly provided on the frame 4, and the temperature sensor is configured to detect the temperature of the energy storage system. The heat dissipation device further includes a controller, and the controller is independently electrically connected to the temperature sensor, the drive member, the transmission member, and the air conditioner 2. The controller is configured to receive a feedback signal sent by the temperature sensor, and control rotation of the drive member, a refrigeration parameter of the air conditioner 2, and stretching of the transmission member according to the feedback signal. The refrigeration parameter of each air conditioner is used to adjust the air volume of the cold air and the temperature of the cold air of each air conditioner. The rotation speed of the return air fan of each air conditioner is adjusted by the air volume of the cold air of each air conditioner.

In another specific embodiment, the present disclosure provides a method for dissipating heat of an energy storage system by using the above heat dissipation device of an energy storage system, wherein the method includes the following steps.

(I) Cold air generated by the air conditioner 2, after being guided by the curved-surface guide plate 5 and the spreader plate 6, is blown into a cold air passage to cool and dissipate heat for the energy storage system on the frame 4, and the cold air, after exchanging heat with the energy storage system, enters the hot air passage and is discharged by the return air fan 3.

(II) When the temperature sensor detects that the temperature of the energy storage system is higher than a first temperature threshold, the controller adjusts the air conditioner 2, to increase the air volume of cold air of the air conditioner 2, lower the temperature of the cold air, and increase the rotation speed of the return air fan 3; when the temperature sensor detects that the temperature of the energy storage system is uneven, the drive member is controlled by the controller to drive the spreader plate 6 to slide along the guide rail so as to adjust the distribution of cold air. The first temperature threshold ranges 55° C.~65° C.

The air volume of cold air of each air conditioner ranges 1000 m$^3$/h~2000 m$^3$/h, and the temperature of the cold air ranges 15° C.~20° C.

Embodiment 1

The present embodiment provides a heat dissipation device of an energy storage system. Based on the heat dissipation device of an energy storage system described in a specific embodiment, a housing 1 includes two sets of symmetrically provided frames 4 therein, a cold air passage is formed between the two sets of frames 4, and opening sides of the two guide cavities are provided opposite to each other. Six air conditioners 2 are hung outside the housing 1, and one set of frame 4 corresponds to three air conditioners 2; the curved-surface guide plate has a section in a fan shape, and a central angle of the fan shape is 90°; and a distance between the frame 4 and a side wall of the housing 1 is 150 mm.

The present embodiment further provides a method for dissipating heat of an energy storage system by using the above heat dissipation device of an energy storage system, wherein the method includes the following steps.

(I) Cold air generated by the air conditioner 2, after being guided by the curved-surface guide plate 5 and the spreader plate 6, is blown into a cold air passage to cool and dissipate heat for the energy storage system on the frame 4, and the cold air, after exchanging heat with the energy storage system, enters the hot air passage and is discharged by the return air fan 3.

(II) When the temperature sensor detects that the temperature of the energy storage system is higher than a first temperature threshold, the controller adjusts the air conditioner 2, to increase the air volume of cold air of the air conditioner 2, lower the temperature of the cold air, and increase the rotation speed of the return air fan 3; when the temperature sensor detects that the temperature of the energy storage system is uneven, the drive member is controlled by the controller to drive the spreader plate 6 to slide along the guide rail so as to adjust the distribution of cold air. The first temperature threshold is 60° C.

The air volume of cold air of each air conditioner is 1500 m$^3$/h, and the temperature of the cold air is 18° C.

Embodiment 2

The present embodiment provides a heat dissipation device of an energy storage system. Based on the heat dissipation device of an energy storage system described in Embodiment 1, eight air conditioners 2 are hung outside the housing 1, and one set of frame 4 corresponds to four air conditioners 2; the curved-surface guide plate has a section in a fan shape, and a central angle of the fan shape is 60°; and a distance between the frame 4 and a side wall of the housing 1 is 100 mm.

The present embodiment further provides a method for dissipating heat of an energy storage system by using the above heat dissipation device of an energy storage system, wherein the method includes the following steps.

(I) Cold air generated by the air conditioner 2, after being guided by the curved-surface guide plate 5 and the spreader plate 6, is blown into a cold air passage to cool and dissipate heat for the energy storage system on the frame 4, and the cold air, after exchanging heat with the energy storage system, enters the hot air passage and is discharged by the return air fan 3.

(II) When the temperature sensor detects that the temperature of the energy storage system is higher than a first temperature threshold, the controller adjusts the air conditioner 2, to increase the air volume of cold air of the air conditioner 2, lower the temperature of the cold air, and increase the rotation speed of the return air fan 3; when the temperature sensor detects that the temperature of the energy storage system is uneven, the drive member is controlled by the controller to drive the spreader plate 6 to slide along the guide rail so as to adjust the distribution of cold air. The first temperature threshold is 65° C.

The air volume of cold air of each air conditioner is 2000 m³/h, and the temperature of the cold air is 20° C.

Embodiment 3

The present embodiment provides a heat dissipation device of an energy storage system. Based on the heat dissipation device of an energy storage system described in Embodiment 1, four air conditioners 2 are hung outside the housing 1, and one set of frame 4 corresponds to two air conditioners 2; the curved-surface guide plate has a section in a fan shape, and a central angle of the fan shape is 100°; and a distance between the frame 4 and a side wall of the housing 1 is 200 mm.

The present embodiment further provides a method for dissipating heat of an energy storage system by using the above heat dissipation device of an energy storage system, wherein the method includes the following steps.

(I) Cold air generated by the air conditioner 2, after being guided by the curved-surface guide plate 5 and the spreader plate 6, is blown into a cold air passage to cool and dissipate heat for the energy storage system on the frame 4, and the cold air, after exchanging heat with the energy storage system, enters the hot air passage and is discharged by the return air fan 3.

(II) When the temperature sensor detects that the temperature of the energy storage system is higher than a first temperature threshold, the controller adjusts the air conditioner 2, to increase the air volume of cold air of the air conditioner 2, lower the temperature of the cold air, and increase the rotation speed of the return air fan 3; when the temperature sensor detects that the temperature of the energy storage system is uneven, the drive member is controlled by the controller to drive the spreader plate 6 to slide along the guide rail so as to adjust the distribution of cold air. The first temperature threshold is 55° C.

The air volume of cold air of each air conditioner is 1000 m³/h, and the temperature of the cold air is 15° C.

In the present disclosure, by providing the curved-surface guide plate 5 and the spreader plate 6 on the top of the frame 4, cold air of the air conditioner 2 enters from the top of the frame 4, and is reasonably distributed, then more cold air is distributed to places with a higher temperature, so that the temperature distribution of the energy storage system is uniform, then a good working environment is provided for the battery, and the service life of the energy storage system is extended. The heat dissipation device of an energy storage system has the characteristics such as simple structure, strong adaptability, high heat dissipation efficiency, and good temperature uniformity of the energy storage module.

What is claimed is:

1. A heat dissipation device of an energy storage system, comprising: a housing, wherein at least one frame is provided in the housing, the energy storage system is placed in the at least one frame, a curved-surface guide plate is provided on a top of the at least one frame, at least one air conditioner is hung outside the housing, a cold air outlet of each air conditioner is connected to the curved-surface guide plate; and
    a guide cavity is formed between a concave surface of the curved-surface guide plate and the at least one frame, a spreader plate is provided in the guide cavity, and the spreader plate is configured to adjust a flow direction of gas in the guide cavity.

2. The heat dissipation device according to claim 1, wherein the energy storage system comprises at least one battery module.

3. The heat dissipation device according to claim 2, wherein each frame is provided with at least one battery compartment penetrating through the each frame, and the at least one battery compartment is provided to accommodate the at least one battery module.

4. The heat dissipation device according to claim 3, wherein the at least one battery compartment provided on each frame is arranged in a matrix on the each frame.

5. The heat dissipation device according to claim 2, wherein the curved -surface guide plate is provided along a long side of the at least one frame.

6. The heat dissipation device according to claim 5, wherein the curved -surface guide plate has a section in a fan shape.

7. The heat dissipation device according to claim 6, wherein a central angle of the fan shape ranges 60°~100°.

8. The heat dissipation device according to claim 6, wherein a central angle of the fan shape is 90°.

9. The heat dissipation device according to claim 1, wherein a ventilation baffle is provided between the curved-surface guide plate and the cold air outlet of the at least one air conditioner, wherein the ventilation baffle protrudes from an edge of the at least one frame; and
    the ventilation baffle is provided with at least one cold air port and at least one air vent, and the cold air outlet of each air conditioner is connected to one cold air port.

10. The heat dissipation device according to claim 9, wherein the at least one cold air port and the at least one air vent are provided alternately.

11. The heat dissipation device according to claim 1, wherein a distance between each frame and a side wall of the housing ranges 100 mm~200 mm.

12. The heat dissipation device according to claim 11, wherein an air partition opening is provided close to a side of the top of the at least one frame.

13. The heat dissipation device according to claim 11, wherein at least one hot air outlet is provided on a side wall of the housing located at a hot air passage.

14. A heat dissipation method for an energy storage system, using the heat dissipation device of an energy storage system according to claim 1, comprising a following step:
    cold air in the at least one air conditioner, through the curved-surface guide plate, being blown into the housing, and the spreader plate adjusting a flow direction of the cold air to cool and dissipate heat for the energy storage system.

\* \* \* \* \*